Feb. 6, 1923.

F. W. ROSKOPF.
CRANK HOLDER.
FILED JAN. 25, 1922.

1,444,007

Inventor
Frank Wm Roskopf.
by Orving & Hague Attys.

Patented Feb. 6, 1923.

1,444,007

UNITED STATES PATENT OFFICE.

FRANK WILLIAM ROSKOPF, OF MELBOURNE, IOWA.

CRANK HOLDER.

Application filed January 25, 1922. Serial No. 531,731.

*To all whom it may concern:*

Be it known that I, FRANK WILLIAM ROSKOPF, a citizen of the United States, and a resident of Melbourne, in the county of Marshall and State of Iowa, have invented a certain new and useful Crank Holder, of which the following is a specification.

The object of my invention is to provide a crank holder of simple, durable and inexpensive construction especially adapted for use on tractors and more particularly for use on the kind of tractors that are used for farming purposes, and whereby the crank may be firmly and securely supported in an upwardly inclined position and against rearward movement so that when the tractor is being driven through standing corn stalks or other obstructions the crank can not be pressed back against its spring into engagement with the ratchet on the rapidly rotating driving shaft.

My invention consists in the construction, arrangement and combination of the various parts of the apparatus, whereby the objects contemplated are attained, as hereinafter more fully set forth, pointed out in my claims, and illustrated in the accompanying drawings, in which:

Figure 1:
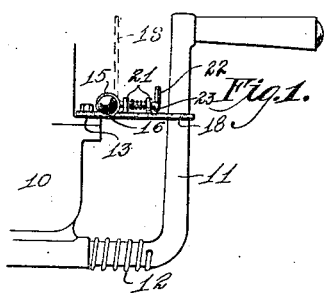
Figure 1 shows a side elevation of that part of a crank shaft having my improved holder shown in position thereon for holding the crank shaft at its upper and forward limits of movement. The dotted lines show the holder swung rearwardly to permit rotation of the crank.
Figure 2:
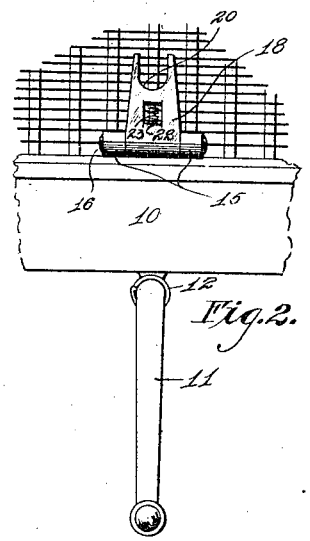
Figure 2 shows a front elevation of the part of an automobile with the crank in a downwardly inclined position and the holder supported in its position extended straight upwardly.
Figure 3:
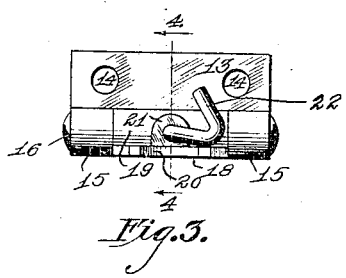
Figure 3 shows a top or plan view of the holder detached.

Referring to the accompanying drawings I have used the reference numeral 10 to indicate generally that part of a tractor shown. The numeral 11 is a crank of the kind ordinarily used on tractors and it is normally held at its forward limit of movement by a spring 12. When it is desired to use the crank it is first pushed rearwardly to engage the ratchet on the front end of the engine driving shaft.

Figure 4:
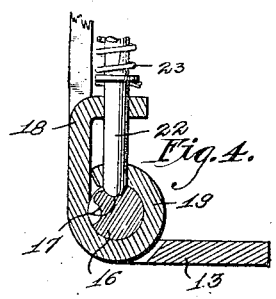
Figure 4 shows a sectional view on the line 4—4 of Figure 3.

My improved crank holder comprises a bracket member 13 having bolt openings 14 therein designed to be bolted to the front portion of the tractor above the crank shaft in the position shown in Figure 1. Its forwardly projecting end portions are formed with two loops 15 and fixed in these loops 15 is a shaft or pintle 16 which is provided at its central portion with two notches 17, as shown in Figure 4, for the purposes hereinafter made clear. The reference numeral 18 indicates a crank holder arm which is provided at its rear end with a loop 19 to rotatably receive the shaft or pintle 16. Its forward end is formed with a notch at 20 to receive a crank and at its central portion are two lugs 21 in which is slidingly mounted a lock bar 22. This lock bar is provided with a spring 23 by which it is normally held at its limit of movement in the direction of the shaft 16. The loop 19 is provided with an opening through which this shaft may extend into position in engagement with the shaft 16.

When the lock bar 22 is moved upwardly against the pressure of its spring then the arm 18 may swing freely from a substantially horizontal position, as shown in Figure 1, to a substantially vertical position, as shown by dotted lines in Figure 1, and when in either one of these two positions the lock bar 22 will enter the notch 17 in the stationary pintle 16.

In practical operation and when cranking the tractor, the crank holder arm is swung to an upwardly inclined position, as shown by dotted lines in Figure 1, and it is there securely held and locked so that it can not possibly fall downwardly and forwardly to a position where it might be struck by the crank when the crank is being rotated.

After the engine has been started then the lock bar 22 is moved away from the pintle 16 and then the arm 18 swings downwardly to a substantially horizontal position with the crank supported in the notch 20 thereof and when in this position the lock pin also locks the bar 18 in its horizontal position so that if the crank should be driven against corn stalks or any other obstructions it can not move the crank rearwardly far enough to permit the rear end of the crank to engage the ratchet in the front of the shaft, and, furthermore, the crank will be supported in an upright position.

The device is of extremely simple and inexpensive construction and obviously may be attached to any kind of a tractor or automobile without in any way changing the construction of any of the adjacent parts of the tractor or automobile.

I claim as my invention:

1. A crank holder comprising a bracket designed to be secured to a tractor or the like above the crank shaft thereof, an arm hinged thereto and capable of movement from a substantially vertical position to a substantially horizontal position, said arm being formed with a notch at its outer end to receive a crank, said parts being so arranged that when the arm is in a horizontal position and in engagement with the crank, pressure in a rearward direction upon the crank can not move it rearwardly.

2. An improved crank holder comprising a bracket designed to be secured to a tractor or the like above the crank shaft and having at its forward end a pintle fixed against rotation and formed with two notches, an arm hinged to the pintle and having a notch in its outer end designed to receive a crank and a spring latch device carried by said arm and designed to co-act with said notches in the pintle in such manner as to lock the arm either in a substantially horizontal position or a substantially vertical position, for the purposes stated.

FRANK WILLIAM ROSKOPF.